Patented July 3, 1928.

1,676,138

UNITED STATES PATENT OFFICE.

ALBERT K. EPSTEIN, OF CHICAGO, ILLINOIS.

PROCESS OF PROVIDING A NEW FOOD PRODUCT AND IMPROVED PRODUCT PRODUCED THEREBY.

No Drawing.   Application filed December 29, 1924.  Serial No. 758,576.

My invention relates to an improved process of providing a new food product and an improved product produced thereby, being directed more particularly to that class of food products containing a protein base such as casein produced preferably from skimmed milk, with a binding or supporting medium added thereto in the nature of an oil. My object is to provide an improved food product employing a suitable edible protein material of the character used in dairy products, such as casein, in combination with ingredients which act as a supporting or binding medium and which may increase the nutritional value thereof, and having other features and advantages hereinafter more particularly pointed out.

A feature of my improved product is that it has better self-supporting or binding qualities in that it will stand up or hold its shape better under relatively higher temperatures and so that the product will not so readily fall apart, thereby having the additional advantage of being able to ship it to warmer climates and to greater distances.

Another feature is that my improved product will not spoil so readily, thereby giving it longer life and holding its flavor longer, with the ensuing commercial advantages flowing therefrom.

Also it will stand higher temperatures than similar products as above referred to heretofore manufactured, so that it need not be kept under very cold temperatures either while in storage, shipping, or in the home in order to preserve its firmness, coherence, and shape.

Furthermore, by the use of a greater range of oils and fats I am not limited to the market changes and other objections to the use of cocoanut oil only.

Furthermore, a product having a better or finer texture is secured, thereby giving it also certain commercial advantages.

Referring now more in detail to my invention of process and product produced thereby, I preferably take a pressed wet casein and combine it with a supporting or binding medium in the nature of edible esters or glycerides of fatty acids, such as an oil, or fat, or both, so that the resultant product remains firm under ordinary temperatures as ranging from above seventy-six degrees Fahrenheit to ninety-eight degrees Fahrenheit, the minimum temperature named being the approximate melting point of natural cocoanut oil and the maximum temperature as designating the body temperature, so that the product will remain firm under more adverse conditions than heretofore but when eaten will melt in the body and become emulsified with the digestive fluids and easily digested.

For mixture with the casein I may employ natural edibile vegetable oils and fats, edible animal oils and fats, or suitable edible animal and vegetable oils and fats in admixture, or partially hydrogenated edible vegetable oils, or a suitable mixture of partially hydrogenated edible oil with natural edible vegetable or animal oils and fats, or a mixture of completely hydrogenated edible vegetable oils with natural edible vegetable or animal oils and fats, used so as to remain firm and not melt except at a temperature over seventy-six degrees Fahrenheit.

Vegetable oils such as refined edible cottonseed oil, corn oil, peanut oil, sesame oil, and soya bean oil are liquid and fluid at ordinary or natural atmospheric summer temperatures, while natural cocoanut oil melts at seventy-six degrees Fahrenheit. These vegetable oils may be mixed with a suitable amount of lard, lard stearine, oleo, oleo oil or oleo stearine, cottonseed oil stearine, or its equivalent, or any combination thereof to give a mixture having a melting point sufficiently above seventy-six degrees Fahrenheit to lend itself to ordinary handling, and in which the final mixture will not become fluid nor quickly disintegrate at ordinary natural temperatures. The above enumerated natural edible vegetable oils which are fluid at ordinary or natural atmospheric summer temperatures may be mixed with suitable amounts of completely or partially hydrogenated edible vegetable oils such as hydrogenated cottonseed or peanut or cocoanut oil, the hydrogenated cocoanut oil having a melting point of around ninety degrees Fahrenheit.

When a soft oil having a melting point of seventy-six degrees Fahrenheit or less is used, such as whole natural cocoanut oil, the resulting product will not stand up very well during the summer time or in a heated room in the winter time, when the temperature is approximately seventy-six degrees Fahrenheit or over. Thus a disadvantage of the product when using cocoanut oil is that when exposed to a temperature of seventy-eight or eighty degrees Fahrenheit, a temperature often reached in the kitchen and dining room of the home, the fatty constituent will melt thereby disturbing the physical coherence of the product, which, of course, is very objectionable. Furthermore, when handled it becomes soft and falls apart. That is it does not stand up firm. While perhaps this does not affect the food value of the product, it does affect its appearance and naturally does not have such an appetizing appearance.

At high summer temperatures the soft oil will melt and leak out of the product making the handling of the material disagreeable and causing a depreciation in its food value because of the loss of oil.

In my improved product all these objections are overcome.

Referring now for illustration to the preferred form of my product and the process by which it is produced, I take for example eighty pounds of pressed wet casein which has a moisture content of about sixty-five per cent.

This pressed wet casein may be produced in any ordinary manner, but I preferably prepare it by clotting skimmed milk by the use of lactic acid bacteria or rennet, or both bacteria and rennet, heating it to a suitable temperature of say approximately ninety degrees Fahrenheit, but sufficient to coagulate the coagulable protein material and separate it from the whey. The whey is then drained off, after which it is purified by washing the coagulated curd or casein with water several times, or sufficiently to remove the residual bacterial and the undesirable milk constituents and traces of flavoring constituents which were formed during the fermentation process and which were imbibed by the casein or spongy white curdy mass.

I now take about one hundred and eight pounds of the washed purified casein and subject it to pressure in a suitable press until it has a moisture content of approximately sixty-five per cent, thus reducing the mass to about eighty pounds in weight, this product being what I term a wet pressed casein.

I then mix eighteen and seven-tenths (18.7) pounds of cocoanut oil having a melting point of seventy-six degrees Fahrenheit and one and three-tenths (1.3) pounds of hydrogenated edible cottonseed oil having a melting point of approximately one hundred and thirty-eight to one hundred and forty degrees Fahrenheit. These oils are heated until sufficiently fluid so that they may be thoroughly mixed. The mixture is then cooled down to a temperature at which it will still remain fluid. The fatty mixture is then distributed in the relatively colder casein.

In order to mix the casein and oils I preferably place the casein in a suitable stirring machine so that it may be thoroughly disintegrated and broken up, and during this operation the fatty mixture is slowly added. The mixing is then continued until the constituent elements are well commingled, this mixing operation running for several minutes.

I now chill this mixture at a temperature sufficiently low so that the product will now lend itself to a process of maceration or further grinding which also gives it a smoother texture.

The wet casein which I use is a collodial dispersion of solid protein in water. The specific physical state in which the casein exists in the white spongy curd-like mass makes possible the imbibition of relatively large amounts of water which is necessary to obtain the desired texture of the final product. If the mixture is subjected to a temperature sufficiently low and for a sufficient length of time to freeze the water, then the collodial equilibrium will be disturbed, the protein is partially denatured, the water leaks out and the product loses its merits.

Therefore in chilling the mixture I preferably subject it to a temperature of about thirty-five degrees Fahrenheit and maintain it at that temperature for a length of time to produce a hard firm mass depending upon the quantity used in a batch.

After this chilling I preferably grind or crush the chilled product by means of stone or steel rolls, or any other suitable mechanism, so that the constituents are commingled to a greater extent and the material more finely comminuted. This produces a more homogeneous mass and gives a finer texture to the product, enhancing its appearance.

After the last macerating action the product is sufficiently plastic to lend itself to molding in suitable shapes. It is then wrapped in paper or any other suitable substance, so as to be better protected for handling.

I do not limit myself to the quantity or proportion of casein or any other suitable protein material nor to the quantity or proportion of oil and fat mixtures specified above. Any convenient quantity or proportion of pressed wet casein and a suitable oil and fat mixture which will give a product of a coherence which can be molded into a definite shape self-sustaining within the temperature range specified, I consider as coming within the scope of this invention. I can also add to the composition of matter specified above certain condiments such as salt, mustard, caraway seed, and similar substances. I may enrich its biological nutritional value by incorporating into the mixture before it is hardened, suitable mineral salts such as calcium phosphate, iron salts, and minute quantities of sodium iodide or their equivalents.

If the moisture content of the washed casein is high, such as seventy-five per cent, it is difficult to combine it with the admixture of oils and fats to produce a product which contains sufficient mechanical strength or firmness to lend itself to be molded into a loaf so it will keep its shape. The product will be too soft. It is therefore advisable to reduce the moisture content of the washed curd by subjecting it to a preliminary pressing process. I have found that when the curd has been sufficiently pressed so that it contains a moisture content of about sixty-five per cent it lends itself to be worked in, advantageously, with the mixture of oils and fats producing a product of desired consistency. However, I do not desire to limit the scope of this invention to a casein with a moisture content designated above. A wet casein of relatively much higher or lower moisture content may be used, depending upon the consistency of the finished product desired. The moisture content of the casein also may vary, depending upon the physical texture of the casein and upon the method used in its manufacture.

What I claim as new and desire to secure by United States Letters Patent is:

1. As a new article of manufacture, a food product comprising a chilled combination of a wet casein product, fluid cocoanut oil and hydrogenated deodorized cottonseed oil comminuted and commingled and molded into a relatively firm homogeneous mass.

2. As a new article of manufacture, a food product comprising a wet casein product, a normally fluid vegetable oil with a hydrogenated vegetable oil hardened sufficiently to be comminuted and commingled and molded into a relatively firm homogeneous mass.

3. As a new article of manufacture, a food product comprising wet casein and a fatty mixture consisting of a normally fluid vegetable oil in combination with a relatively harder edible fat binder in quantities sufficient to produce a fatty mixture of a melting point between 76 degrees F. and 98 degrees F. commingled and comminuted with the casein and molded into a relatively firm and homogeneous mass.

4. As a new article of manufacture, a food product comprising proportionately approximately eighty pounds of wet pressed casein, approximately eighteen and seven-tenths pounds of cocoanut oil and approximately one and three-tenths pounds of edible hydrogenated cottonseed oil comminuted and commingled and molded into a relatively firm homogeneous mass.

5. The method of producing an article of food which consists of commingling casein and cocoanut oil and edible hydrogenated cottonseed oil, said cottonseed oil having a melting point sufficiently high to substantially raise the normal melting point of the cocoanut oil, cooling the mixture to a temperature above freezing until the mass becomes a hard rigid body, and then comminuting the mixture into a macerated state.

6. The method of producing an article of food which consists in commingling casein and edible esters of fatty acids having a melting point between 76 degrees F. and 98 degrees F. by mixing the ingredients with the latter in a fluid state, then reducing the mixture to a comminuted state, then chilling the mixture into a hardened state and comminuting the chilled mixture, and then molding the comminuted material to a desired shape.

7. The method of producing an article of food which consists in commingling casein and edible glycerides of fatty acids having a melting point between 76 degrees F. and 98 degrees F. by mixing the ingredients with the latter in a fluid state, then reducing the mixture to a comminuted state, then chilling the mixture into a hardened state and comminuting the chilled mixture, and then molding the comminuted material to a desired shape.

8. As a new article of manufacture, a food product comprising wet casein and a mixture of edible glycerides of fatty acids proportioned to produce a fatty mixture of a melting point between 76 degrees F. and 98 degrees F. but sufficiently hard to be commingled and comminuted with the casein and molded into a relatively firm and homogeneous mass.

In witness whereof, I hereunto subscribe my name this 22nd day of December, 1924.

ALBERT K. EPSTEIN.